July 11, 1939.  E. S. BISSELL  2,165,916
BEARING AND SEALING MEANS
Filed Aug. 18, 1937  2 Sheets-Sheet 1
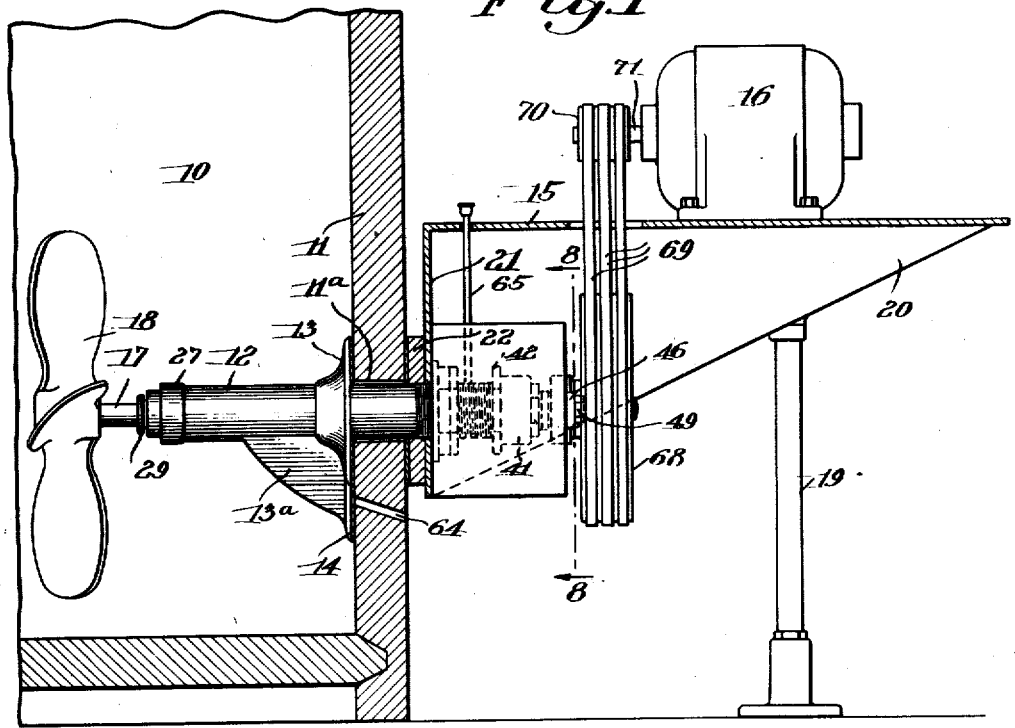
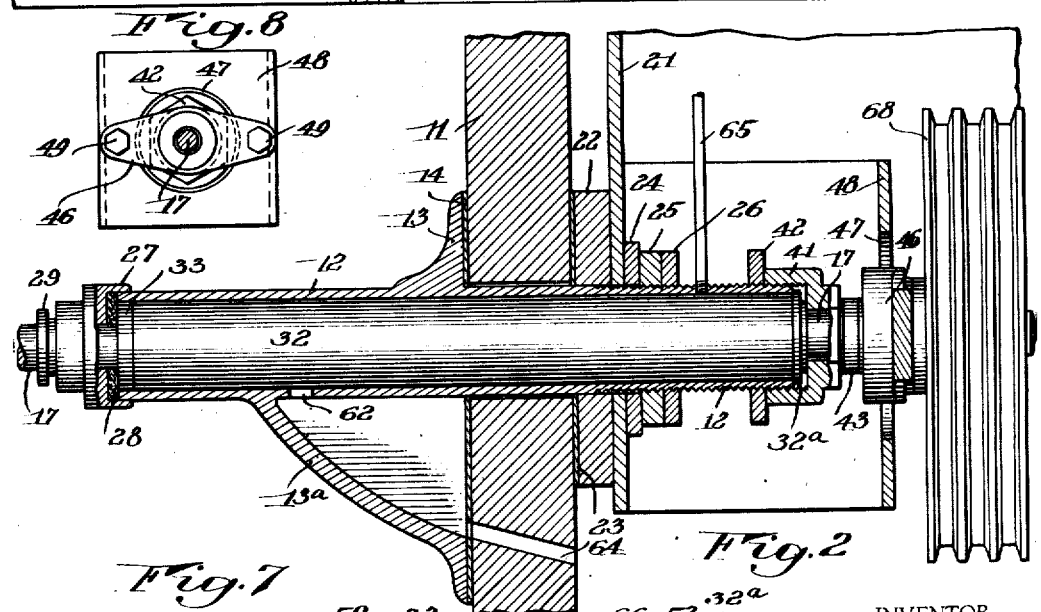
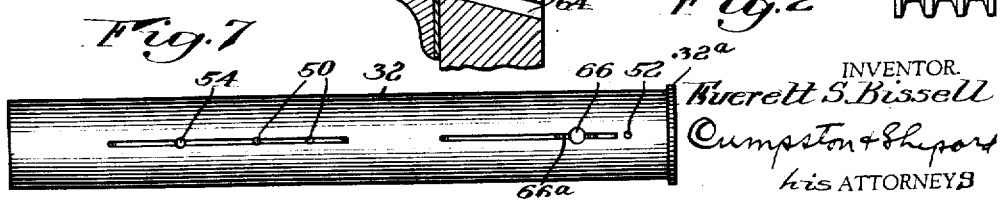
INVENTOR.
Everett S. Bissell
Cumpston & Shepard
his ATTORNEYS

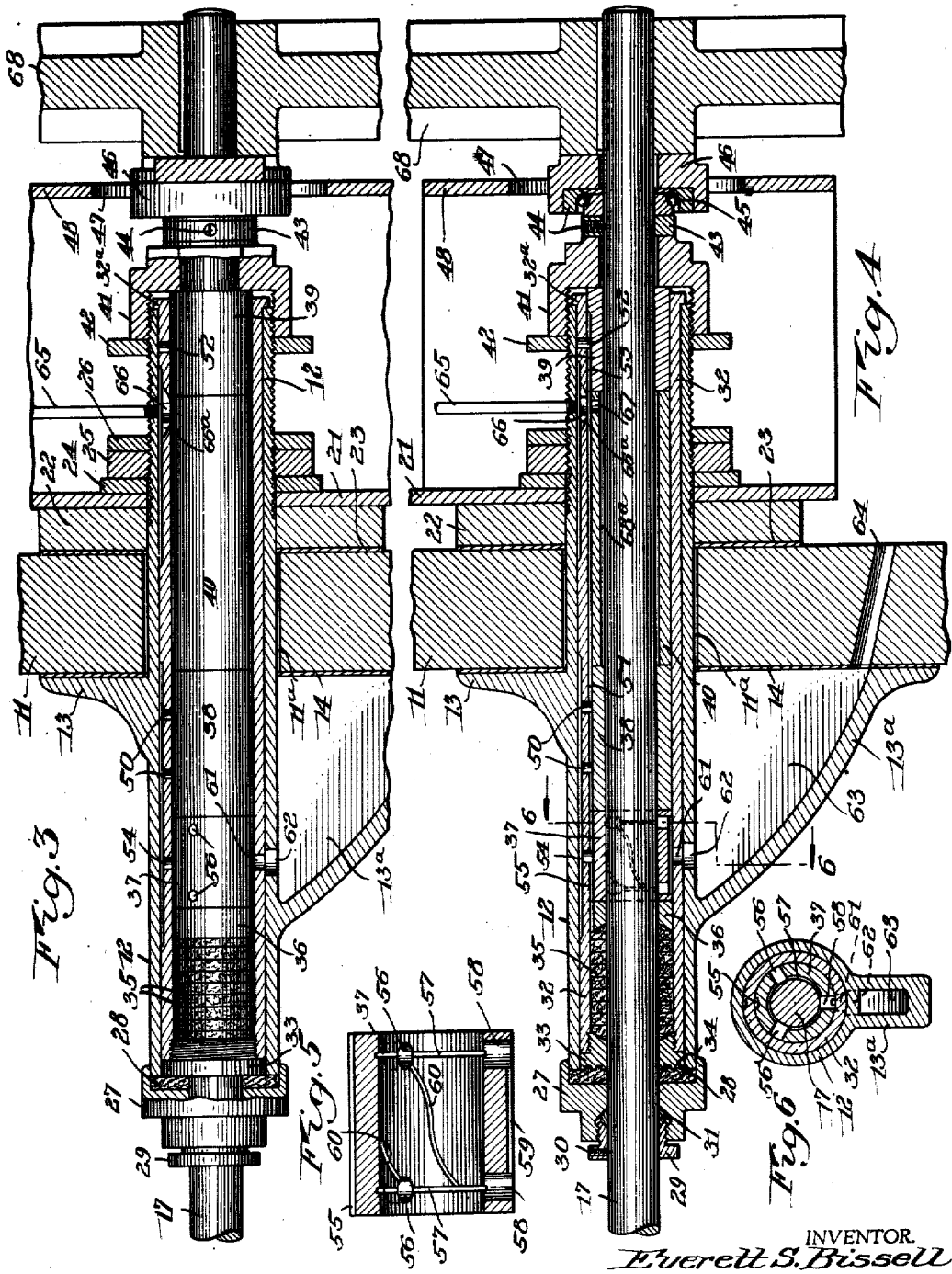

Patented July 11, 1939

2,165,916

UNITED STATES PATENT OFFICE 2,165,916

BEARING AND SEALING MEANS

Everett S. Bissell, Irondequoit, N. Y., assignor to Mixing Equipment Co., Inc., Rochester, N. Y., a corporation of New York Application August 18, 1937, Serial No. 159,749

8 Claims. (Cl. 308—36.1)

The present invention relates to means for agitating, mixing, circulating, or otherwise working various fluid, liquid, or semi-liquid materials such, for example, as food products, chemicals and various other materials.

The invention has for its object to provide in apparatus of the class described, an improved shaft bearing structure for attachment to a tank or receptacle for the material to be worked, which is of simple construction, efficient in operation, and which can be conveniently assembled and readily installed.

A further object of the invention is to provide in a structure of this class, improved means for preventing the fluid or liquid of the tank from escaping to the shaft bearings and in which arrangement said means, together with other parts including the bearings of the shaft, are rendered accessible from the exterior of the tank or receptacle whereby to avoid having to enter the tank to effect removal of said parts as has been necessary in previous installations of this type.

A further object of the invention is to provide an improved mounting structure for the shaft for operating the fluid working means which will afford a rigid support for the shaft and its bearings and which will serve to maintain the latter in proper alinement under all conditions of operation.

A further object of the invention is to provide improved means by which the shaft bearings may be readily and conveniently lubricated from the exterior of the tank.

To these and other ends the invention resides in certain improvements and combinations of parts, all as will be hereinafter more fully described, the novel features being pointed out in the claims at the end of the specification.

In the drawings:

Fig. 1 is a part sectional elevation illustrating one embodiment of the invention;

Fig. 2 is a similar view in which the outer tubular casing for the agitator shaft is shown in section;

Fig. 3 is a longitudinal sectional elevation drawn to an enlarged scale and showing the casing and the non-rotatable cartridge therein for supporting the stuffing box and other parts in section;

Fig. 4 is a similar view in which the casing, the cartridge therein and the parts surrounding the shaft within the cartridge are shown in section;

Fig. 5 is a section drawn to an enlarged scale and taken longitudinally through the bleeder sleeve;

Fig. 6 is a transverse section taken on line 6—6 of Fig. 4;

Fig. 7 is a detailed view of the cartridge or sleeve shown removed from the tubular casing, and Fig. 8 is a section taken substantially on line 8—8 of Fig. 1.

The same reference numerals throughout the several views indicate the same parts.

The present invention embodies generally a tank or receptacle having improved shaft mounting means projecting therein, including a casing and a shaft extending therethrough for actuating the means for working the fluid, and in which arrangement the casing contains a detachable unit in surrounding relation to the shaft and includes bearing means therefor, packing spaced in advance of the bearing means, and means between the packing and the bearing means for intercepting and diverting any fluid or liquid which may escape past the packing, said parts, upon detachment of the unit, being made readily accessible for removal to permit of the insertion of new parts when repairs are needed.

An important feature of the invention is that of rendering the packing for protecting the shaft bearings, and also other parts, readily accessible from the exterior of the fluid holding tank or receptacle so as to avoid having to enter the tank to effect removal of said parts, this being particularly objectionable and dangerous in cases where certain materials such, for example, as various chemicals, acids and the like have been supplied to the tank, contact with which or the fumes of which might be dangerous to the occupant of the tank.

Another important feature of the invention is the provision of improved means for preventing escape of the fluid or liquid of the tank to the shaft bearings, whereby to protect the latter against the chemical action of certain liquids and from the injurious effects of abrasives or gritty material held in suspension by other liquids.

Referring to the drawings, 10 designates a liquid or fluid holding tank or receptacle of any preferred design which may be constructed of any suitable material. Extending through an opening 11a in the side wall 11 of the tank in a tubular casing 12 provided with a flange 13 between which and the wall of the tank is gasket 14 for sealing the space between the flange and said wall. Disposed at the outside of the tank is a bracket 15 for supporting an electric motor 16 operatively connected with the propeller shaft 17 in a manner described hereinafter. The bracket 15 may be supported by a pair of vertically adjustable standards 19, only one of which is shown, and each suitably connected preferably with one of the side walls 20 of the bracket.

The outer end of the tubular casing 12 is threaded and extended through the vertical wall 21 of the bracket, as shown in Fig. 2. A spacing or wedging member 22 is interposed between said wall and the wall of the casing, a gasket 23 being interposed between the spacing member and the tank wall to seal the joint between the same. A collar or washer 24 is positioned on the tubular casing and is clamped in engagement with the wall 21 by a nut 25 threaded on the casing and secured in position by a lock nut 26. In this construction and flange 13 of the tubular casing 12 is firmly clamped upon the inner face of the tank wall by the nut 25 whereby the casing is rigidly secured upon said wall.

The inner end of the casing is closed by a cap 27, between which and the casing is disposed felt or other suitable packing 28, tightly compressed within the cap for rotation therewith in contact with the end of the casing. Screwed into the cap is a plug 29 which is fixed on the shaft 17 by a set screw 30 whereby the cap is made to rotate and serves to rotate the packing 28 in contact with the plug 33 for closing the inner end of the casing. The screw plug serves to compress a sealing ring 31 disposed within the cap and formed preferably of soft metal, such, for example, as lead which affords a tight seal between the cap and the shaft to prevent the liquid from seeping through to the interior of the tubular casing 12.

Mounted within the casing is a stationary sleeve or cartridge 32 extending substantially the full length of the casing and having a flange 32a on its outer end engaging the outer end of the casing and limiting inward movement of the sleeve. The sleeve is provided at its inner end with a screw plug 33 in contact with which the packing 28 is adapted to rotate, said plug being provided with annular grooves 34 within which the packing is forced under pressure whereby it will effectively prevent any liquid tending to seep between the casing 12 and cap 27 from finding its way to the shaft 17.

The main packing for the shaft 17 is indicated at 35 between the plug 33 and a compression ring 36 contacted by a bleeder sleeve 37 housed within the cartridge. Also mounted within the cartridge are the inner and outer shaft bearings 38 and 39 respectively, which are separated by a compression sleeve 40. The bleeder sleeve operates in a manner described hereinafter to prevent the liquid which may escape past the packing from reaching the shaft bearings and damaging the same.

The outer end of the tubular casing 12 is provided with a cap 41 which when screwed into the position shown in Figs. 3 and 4 will urge the bearings 38 and 39, the compressor ring 40 therebetween, and the bleeder sleeve 37 and ring 36 inwardly of the tubular casing to compress the packing therein. When the cap has been adjusted to final position on the tubular casing, a nut 42 also threaded on the casing will be screwed into position to engage and lock the cap, as shown in Figs. 3 and 4.

A thrust collar 43 is secured on the shaft in engagement with the cap by a set screw 44 and a thrust bearing 45 for the shaft is mounted thereon in engagement with said collar, said bearing being disposed within a recessed supporting member 46 lying within an opening 47 formed in the rear wall of a U-shaped supporting member 48, suitably connected with the vertical wall 21 of the bracket 15. The bearing supporting member 46 is connected with the U-shaped member by means of the bolts 49, as shown in Figs. 1 and 8. The shaft is therefore supported by an outer bearing for rotation within the bearings 38 and 39 of the cartridge, disposed within the tubular casing 12.

The bearing 38 is prevented from rotating or turning within the sleeve 32 by the pins 50 anchored within the wall of the sleeve and projecting within a longitudinally extending groove 51 formed in said bearing. Likewise the outer bearing 39 is secured against turning by a pin 52 anchored within the wall of the sleeve and projecting within a groove 53 formed in the bearing. A pin 54 secured within the wall of the bearing sleeve is extended within a groove 55 of the bleeder sleeve to secure the latter against rotation within the bearing sleeve.

The bleeder sleeve 37 is provided with openings 56 through its wall which communicate with annular grooves 57 formed interiorly of the sleeve and which in turn are in communication with spaced outlet openings 58 discharging through a longitudinally extending groove 59 formed in the outer face of the sleeve. Each of the openings 56 has a wiping groove 60 extending therefrom to the annular groove corresponding to the other opening 56 at an inclination to the axis of the sleeve as shown in Fig. 5. The groove 59 is in communication with the openings 61 and 62 of the bearing sleeve 32 and tubular casing 12, respectively, through which the liquid will discharge to a well 63 formed in a channel-like member 13a extending downwardly from the casing 12 and merging with the flange 13 thereof, as shown in Figs. 1 and 6. Leading from the well and extending through the wall 11 of the receptacle is a drain passage 64 for carrying off the liquid collected and discharged by the bleeder sleeve.

It will be understood that any liquid which may find its way between the packing and the shaft, or otherwise escape to the bleeder sleeve, will be collected by the wiping and annular grooves of the sleeve and discharged through the openings 58 and longitudinal groove 59 to the outlet openings 61 and 62 into the well 63 for discharge by gravity through the drain passage 64 of the wall 11 of the receptacle. It will be apparent therefore that such liquid as may escape through to the bleeder sleeve will be discharged therefrom in the manner described and thus prevented from reaching the shaft bearing 38 and damaging the same. The protection thus afforded is particularly advantageous in cases where liquids or chemicals are supplied to the receptacle which tend to corrode the bearing materials, or liquids carrying abrasive or gritty substances in suspension, which obviously would be injurious to the bearings.

Lubricant may be supplied to the inner and outer shaft bearings 38 and 39 from any suitable supply source, not shown, through a delivery pipe 65 having its inner end threaded within the wall of the tubular casing 12 and communicating with an opening 66 in the wall of the bearing sleeve 32. The last mentioned opening is provided with oppositely extending slots 66a which facilitate discharge of the lubricant downwardly into an opening 67 formed in the compression sleeve 40, the bore of which is made slightly larger than the diameter of the shaft to afford an annular space 68a for the discharge of the lubricant along the shaft to the inner and outer bearings 38 and 39 at the opposite ends of said sleeve.

The propeller shaft has fixed on the outer end thereof a grooved driving pulley 68 driven by a plurality of belts 69 engaging a pulley 70 mounted on and driven by the motor shaft 71, as shown in Fig. 1.

To effect removal of the cartridge or bearing sleeve 32 from the casing 12, it is necessary to first remove the pulley 68 from the shaft, the thrust bearing 45, the collar 43 and the cap 41 from the tubular casing 12. When this has been done, suitable means not shown may be employed to engage and remove the cartridge or bearing sleeve by an outward pull thereon, at which time the parts surrounding the shaft within the sleeve will be withdrawn with the latter.

While the bearing structure described and claimed herein is particularly adapted for supporting a shaft for operating fluid or liquid agitating means, it will be understood that said bearing structure is intended to have general application as shaft supporting means and may be employed wherever a shaft is to be extended through a wall and sealed against leakage of the liquid.

It will be understood that the term "working the fluid," employed in the claims, is intended to cover circulation, agitation, mixing, blending or conditioning the various materials to be acted upon within the receptacle for whatever purpose desired.

I claim:

1. In apparatus of the class described, a tubular casing for extension inwardly through a wall of a fluid holding receptacle, a sleeve detachably mounted within the tubular casing, a shaft extending through the sleeve and the casing, bearing means for the shaft within the sleeve, packing surrounding the shaft within the sleeve and spaced from and in advance of said bearing means, and means interposed between the packing and the bearing means and lying within the sleeve for intercepting and discharging fluid which may escape past the packing whereby to protect said bearing means from injury by the fluid.

2. In apparatus of the class described, a tubular casing for extension inwardly through a wall of a fluid holding receptacle, a bearing sleeve within the tubular casing, a shaft extending through the sleeve and the tubular casing, bearing means for the shaft within the sleeve, packing surrounding the shaft within the sleeve and spaced from and in advance of said bearing means, and a bleeder sleeve within the bearing sleeve between the packing and the bearing means, said bleeder sleeve being formed to intercept fluid which may escape past the packing thereto whereby to exclude the fluid from said bearing means, said bearing sleeve and casing having communicating outlets in the side walls thereof for draining the fluid intercepted by the bleeder sleeve.

3. In apparatus of the class described, a tubular casing for extension inwardly through a wall of a fluid holding receptacle, a bearing sleeve within the tubular casing, a shaft extending through the sleeve and the tubular casing, bearing means for the shaft within the sleeve, packing surrounding the shaft within said sleeve and spaced from and in advance of said bearing means, a bleeder sleeve lying within the bearing sleeve and interposed between the packing and the bearing means, said bleeder sleeve being formed to intercept fluid which may escape thereto past the packing, said bearing sleeve and casing having communicating outlets in the side walls thereof for discharging the fluid intercepted by the bleeder sleeve, and means connected with said casing for receiving the fluid discharging from said outlets.

4. In apparatus of the class described, a tubular casing for extension inwardly through a wall of a fluid holding receptacle, a sleeve detachably mounted within the tubular casing, a shaft extending through the sleeve and the casing, packing surrounding the shaft in the inner end of the sleeve, inner and outer bearings for the shaft within the sleeve, a spacing member for the bearings interposed therebetween within the sleeve, a member surrounding the shaft between the inner bearing and the packing for intercepting and diverting from said inner bearing fluid which may escape past said packing, said bearings and said spacing and fluid intercepting members being slidably mounted within said sleeve, and means adjustable on said casing for engaging the receptacle exteriorly thereof and for urging said bearings and said spacing and fluid intercepting members inwardly of the sleeve to compress the packing therein, the packing of the sleeve being accessible through the inner end thereof upon removal of the sleeve from the casing.

5. In apparatus of the class described, a tubular casing for extension inwardly through a wall of a fluid holding receptacle, a bearing sleeve detachably mounted within the tubular casing, a shaft extending through the sleeve and the casing, bearing means for the shaft within the sleeve, packing surrounding the shaft within the sleeve and spaced from and in advance of said bearing means, a retaining member for the packing connected with the inner end of the bearing sleeve, and bleeder sleeve interposed between the packing and the bearing means and having interiorly formed communicating grooves inclined one relative to another and adapted for intercepting fluid which may escape past the packing, said sleeve and casing having communicating outlets for discharging the fluid intercepted by said grooves whereby to protect said bearing means from injury by the fluid.

6. In apparatus of the class described, a tubular casing for extension inwardly through a wall of a fluid holding receptacle and exteriorly of the receptacle, a bearing sleeve detachably mounted within the casing, a shaft extending through the sleeve and casing, means fixed on the shaft for rotation therewith and forming a seal between the shaft and the inner ends of said sleeve and casing, packing surrounding the shaft in the inner end of the sleeve, inner and outer bearings within the sleeve, a spacing member within the sleeve between said bearings, a member surrounding the shaft between the packing and said inner bearing for intercepting the fluid which may escape past the packing to said member, said sleeve and casing having communicating outlets in the side walls thereof for draining the fluid intercepted by said member, and means for holding said bearings and said fluid intercepting member against turning within the said sleeve, said sleeve and the parts contained therein being removable as a unit from said shaft and tubular casing without removal of either from the receptacle and without breaking the seal between the shaft and inner end of the casing.

7. In apparatus wherein a rotatable shaft extends through a wall and is driven by means on the outside of the wall and has mounted on the inside of the wall an operating element exposed to liquid, a casing extending on the inside of said wall, a sleeve surrounding the shaft in said casing and insertable in the casing from outside of said wall, packing inside of said sleeve and surrounding said shaft, a bearing for said shaft close to the operating element and inside of said sleeve, means between said packing and said sleeve for intercepting and diverting from said bearing fluid which may escape past said packing, and means accessible from the exterior of said wall for compressing said packing.

8. In apparatus wherein a rotatable shaft extends through a wall and is driven by means on the outside of the wall and has mounted on the inside of the wall at a substantial distance therefrom an operating element exposed to the liquid, a relatively long tubular casing extending through the wall and having its inner end terminating adjacent the operating element and through which the shaft extends, a relatively long tubular sleeve in said casing surround the shaft and having its inner end terminating adjacent the inner end of the casing, packing inside of said sleeve and surrounding said shaft, a bearing for said shaft inside of said sleeve, means between said packing and said sleeve and including an opening in the sleeve and casing for intercepting and diverting from said bearing fluid which may escape past said packing, and means accessible from the exterior of said wall for compressing said packing.

EVERETT S. BISSELL.

---

CERTIFICATE OF CORRECTION.

Patent No. 2,165,916.           July 11, 1939.

EVERETT S. BISSELL.

It is hereby certified that error appears in the printed specification of the above numbered patent requiring correction as follows: Page 3, second column, line 42, claim 5, before "bleeder" insert the article a; page 4, second column, line 7, claim 8, for "surround" read surrounding; and that the said Letters Patent should be read with this correction therein that the same may conform to the record of the case in the Patent Office.

Signed and sealed this 22nd day of August, A. D. 1939.

Leslie Frazer (Seal)           Acting Commissioner of Patents.

7. In apparatus wherein a rotatable shaft extends through a wall and is driven by means on the outside of the wall and has mounted on the inside of the wall an operating element exposed to liquid, a casing extending on the inside of said wall, a sleeve surrounding the shaft in said casing and insertable in the casing from outside of said wall, packing inside of said sleeve and surrounding said shaft, a bearing for said shaft close to the operating element and inside of said sleeve, means between said packing and said sleeve for intercepting and diverting from said bearing fluid which may escape past said packing, and means accessible from the exterior of said wall for compressing said packing.

8. In apparatus wherein a rotatable shaft extends through a wall and is driven by means on the outside of the wall and has mounted on the inside of the wall at a substantial distance therefrom an operating element exposed to the liquid, a relatively long tubular casing extending through the wall and having its inner end terminating adjacent the operating element and through which the shaft extends, a relatively long tubular sleeve in said casing surround the shaft and having its inner end terminating adjacent the inner end of the casing, packing inside of said sleeve and surrounding said shaft, a bearing for said shaft inside of said sleeve, means between said packing and said sleeve and including an opening in the sleeve and casing for intercepting and diverting from said bearing fluid which may escape past said packing, and means accessible from the exterior of said wall for compressing said packing.

EVERETT S. BISSELL.

---

CERTIFICATE OF CORRECTION.

Patent No. 2,165,916.                          July 11, 1939.

EVERETT S. BISSELL.

It is hereby certified that error appears in the printed specification of the above numbered patent requiring correction as follows: Page 3, second column, line 42, claim 5, before "bleeder" insert the article a; page 4, second column, line 7, claim 8, for "surround" read surrounding; and that the said Letters Patent should be read with this correction therein that the same may conform to the record of the case in the Patent Office.

Signed and sealed this 22nd day of August, A. D. 1939.

Leslie Frazer (Seal)                                             Acting Commissioner of Patents.